(12) United States Patent
Yi et al.

(10) Patent No.: US 11,336,494 B2
(45) Date of Patent: May 17, 2022

(54) METHOD AND APPARATUS FOR GENERATING SIGNAL IN WIRELESS COMMUNICATION SYSTEM

(71) Applicant: LG ELECTRONICS INC., Seoul (KR)

(72) Inventors: Yunjung Yi, Seoul (KR); Byounghoon Kim, Seoul (KR); Sukhyon Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 304 days.

(21) Appl. No.: 16/492,589

(22) PCT Filed: Apr. 16, 2019

(86) PCT No.: PCT/KR2019/004570
§ 371 (c)(1),
(2) Date: Sep. 9, 2019

(87) PCT Pub. No.: WO2019/203532
PCT Pub. Date: Oct. 24, 2019

(65) Prior Publication Data
US 2021/0328732 A1 Oct. 21, 2021

Related U.S. Application Data

(60) Provisional application No. 62/658,586, filed on Apr. 16, 2018.

(51) Int. Cl.
| | | |
|---|---|---|
| *H04L 27/26* | (2006.01) | |
| *H04L 5/00* | (2006.01) | |
| *H04W 72/04* | (2009.01) | |

(52) U.S. Cl.
CPC ........ *H04L 27/26025* (2021.01); *H04L 5/001* (2013.01); *H04L 5/0094* (2013.01); *H04W 72/0453* (2013.01); *H04W 72/048* (2013.01)

(58) Field of Classification Search
CPC . H04L 27/26025; H04L 5/001; H04L 5/0094; H04W 72/0453
See application file for complete search history.

(56) References Cited

U.S. PATENT DOCUMENTS

2013/0051485 A1* 2/2013 Taori ................... H04L 27/2626
375/260
2016/0352551 A1 12/2016 Zhang et al.
(Continued)

FOREIGN PATENT DOCUMENTS

| CN | 105556887 | 5/2016 |
|---|---|---|
| CN | 107852308 | 3/2018 |

(Continued)

OTHER PUBLICATIONS

European Patent Office Application Serial No. 19761721.0, Search Report dated Mar. 10, 2020, 8 pages.
(Continued)

*Primary Examiner* — Kevin C. Harper
(74) *Attorney, Agent, or Firm* — Lee, Hong, Degerman, Kang & Waimey PC

(57) ABSTRACT

A method and apparatus for generating a signal in a wireless communication system is provided. A user equipment (UE) which operates in a new radio access technology (RAT) generates a signal for a numerology based on a center frequency of a carrier, and transmits the generated signal. The center frequency of the carrier is based on a largest subcarrier spacing that a network supports.

7 Claims, 14 Drawing Sheets

(56) References Cited

U.S. PATENT DOCUMENTS

| | | | |
|---|---|---|---|
| 2017/0272213 A1* | 9/2017 | Skold | H04W 72/0406 |
| 2017/0325250 A1 | 11/2017 | Manolakos et al. | |
| 2018/0035416 A1 | 2/2018 | Yi et al. | |
| 2018/0048436 A1 | 2/2018 | Park et al. | |
| 2018/0091267 A1 | 3/2018 | Kim et al. | |
| 2019/0182094 A1* | 6/2019 | Gaal | H04L 27/2607 |
| 2020/0021420 A1* | 1/2020 | Li | H04L 5/0007 |
| 2020/0068512 A1* | 2/2020 | Xue | H04L 5/0053 |

FOREIGN PATENT DOCUMENTS

| | | |
|---|---|---|
| WO | 2018/055017 | 3/2018 |
| WO | 2018048187 | 3/2018 |

OTHER PUBLICATIONS

Korean Intellectual Property Office Application No. 10-2020-0026088, Office Action dated Mar. 20, 2020, 6 pages.

Samsung, "Summary of Offline Discussion on RMSI CORESET Configuration", 3GPP TSG RAN WG1 Meeting #91, R1-1721709, Dec. 2017, 26 pages.

3rd Generation Partnership Project (3GPP), "Technical Specification Group Radio Access Network; NR; Physical channels and modulation (Release 15)," 3GPP TS 38.211 V15.1.0, Mar. 2018, 90 pages.

Korean Intellectual Property Office Application No. 10-2019-0044373, Office Action dated Aug. 22, 2019, 5 pages.

Spreadtrum Communications, "Remaining issues on OFDM signal generation", 3GPP TSG RAN WG1 Meeting AH 1801, R1-1800284, Jan. 2018, 10 pages.

Nokia, et al., "On the location of subcarriers within the PRB grid", 3GPP TSG RAN WG1 Meeting #88, R1-1703197, Feb. 2017, 7 pages.

Huawei, et al., "Remaining issues on bandwidth part and wideband operation", 3GPP TSG RAN WG1 NR Ad Hoc Meeting, R1-1800018, Jan. 2018, 16 pages.

Huawei, et al., "On k0 for OFDM signal generation", 3GPP TSG RAN WG1 Meeting #92bis, R1-1803651, Apr. 2018, 8 pages.

Korean Intellectual Property Office Application No. 10-2020-0026088, Notice of Allowance dated Oct. 6, 2020, 2 pages.

Japan Patent Office Application No. 2019-553459, Office Action dated Nov. 17, 2020, 4 pages.

Samsung, "Remaining Issues on RB Grid", R1-1714573, 3GPP TSG RAN WG1 Meeting #90, Aug. 2017, 3 pages.

Huawei, HiSilicon, "RMSI delivery", R1-1719372, 3GPP TSG RAN WG1 Meeting #91, Dec. 2017, 9 pages.

Huawei, HiSilicon, "Coexistence of different UE types on a wideband carrier", R1-1713733, 3GPP TSG RAN WG1 Meeting #90, Aug. 2017, 6 pages.

The State Intellectual Property Office of the People's Republic of China Application Serial No. 201980001708.X, Office Action dated Sep. 15, 2021, 9 pages.

Samsung, "Remaining issues on RB grid," 3GPP TSG RAN WG1 NR Ad-Hoc Meeting, R1-1700997, Jan. 2017, 3 pages.

Zte et al., "About RB Grid Definition and Handling Inter-numerology Interference in NR," 3GPP TSG-RAN WG1 Meeting #86bis, R1-1608963, Oct. 2016, 8 pages.

NEC, "Numerology indication for a mixed numerology carrier," 3GPP TSG RAN WG1 Meeting NR Adhoc, R1-1700860, Jan. 2017, 5 pages.

* cited by examiner

METHOD AND APPARATUS FOR GENERATING SIGNAL IN WIRELESS COMMUNICATION SYSTEM

CROSS-REFERENCE TO RELATED APPLICATIONS

This application is the National Stage filing under 35 U.S.C. 371 of International Application No. PCT/KR2019/004570, filed on Apr. 16, 2019, which claims the benefit of U.S. Provisional Application No. 62/658,586, filed on Apr. 16, 2018, the contents of which are all hereby incorporated by reference herein in their entirety.

BACKGROUND OF THE INVENTION

Field of the Invention

The present invention relates to wireless communications, and more particularly, to a method and apparatus for generating a signal in a new radio access technology (RAT).

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

SUMMARY OF THE INVENTION

NR supports multiple numerologies corresponding to different subcarrier spacings. The present invention provides a method and apparatus for generating a signal in consideration of multiple numerologies in NR.

In an aspect, a method performed by a user equipment (UE) in a wireless communication system is provided. The method includes generating a signal for a numerology based on a center frequency of a carrier, and transmitting the generated signal. The center frequency of the carrier is based on a largest subcarrier spacing that a network supports; and In another aspect, a user equipment (UE) in a wireless communication system is provided. The UE includes a memory, a transceiver, and a processor, operably coupled to the memory and the transceiver. The processor is configured to generate a signal for a numerology based on a center frequency of a carrier, and control the transceiver to transmit the generated signal. The center frequency of the carrier is based on a largest subcarrier spacing that a network supports.

In NR that supports multiple numerologies, signals generated for each numerology can be aligned with each other.

DESCRIPTION OF EXEMPLARY EMBODIMENTS

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only 01-DMA may be used for DL and only SC-FDMA may be used for UL. Alternatively, OFDMA and SC-FDMA may be used for DL and/or UL.

In this document, the term "I" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A, B, C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

Figure 1:
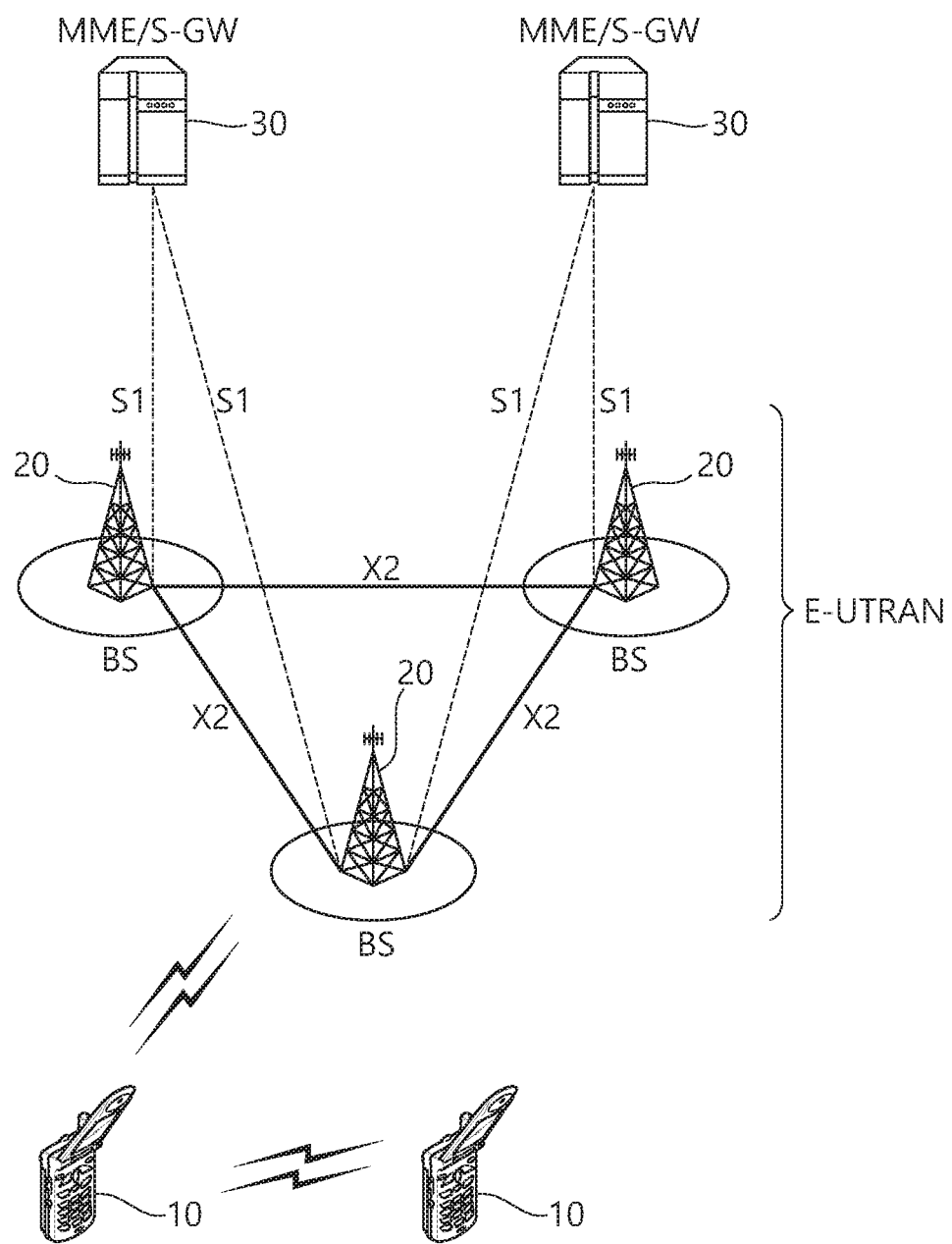
FIG. 1 shows an example of a wireless communication system to which technical features of the present invention can be applied.

FIG. 1 shows an example of a wireless communication system to which technical features of the present invention can be applied. Specifically, FIG. 1 shows a system architecture based on an evolved-UMTS terrestrial radio access network (E-UTRAN). The aforementioned LTE is a part of an evolved-UTMS (e-UMTS) using the E-UTRAN.

Referring to FIG. 1, the wireless communication system includes one or more user equipment (UE; 10), an E-UTRAN and an evolved packet core (EPC). The UE 10 refers to a communication equipment carried by a user. The UE 10 may be fixed or mobile. The UE 10 may be referred to as another terminology, such as a mobile station (MS), a user terminal (UT), a subscriber station (SS), a wireless device, etc.

The E-UTRAN consists of one or more base station (BS) 20. The BS 20 provides the E-UTRA user plane and control plane protocol terminations towards the UE 10. The BS 20 is generally a fixed station that communicates with the UE 10. The BS 20 hosts the functions, such as inter-cell radio resource management (RRM), radio bearer (RB) control, connection mobility control, radio admission control, measurement configuration/provision, dynamic resource allocation (scheduler), etc. The BS may be referred to as another terminology, such as an evolved NodeB (eNB), a base transceiver system (BTS), an access point (AP), etc.

A downlink (DL) denotes communication from the BS 20 to the UE 10. An uplink (UL) denotes communication from the UE 10 to the BS 20. A sidelink (SL) denotes communication between the UEs 10. In the DL, a transmitter may be a part of the BS 20, and a receiver may be a part of the UE 10. In the UL, the transmitter may be a part of the UE 10, and the receiver may be a part of the BS 20. In the SL, the transmitter and receiver may be a part of the UE 10.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 30 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 10 is connected to the BS 20 by means of the Uu interface. The UEs 10 are interconnected with each other by means of the PC5 interface. The BSs 20 are interconnected with each other by means of the X2 interface. The BSs 20 are also connected by means of the S1 interface to the EPC, more specifically to the MME by means of the S1-MME interface and to the S-GW by means of the S1-U interface. The S1 interface supports a many-to-many relation between MMEs/S-GWs and BSs.

Figure 2:
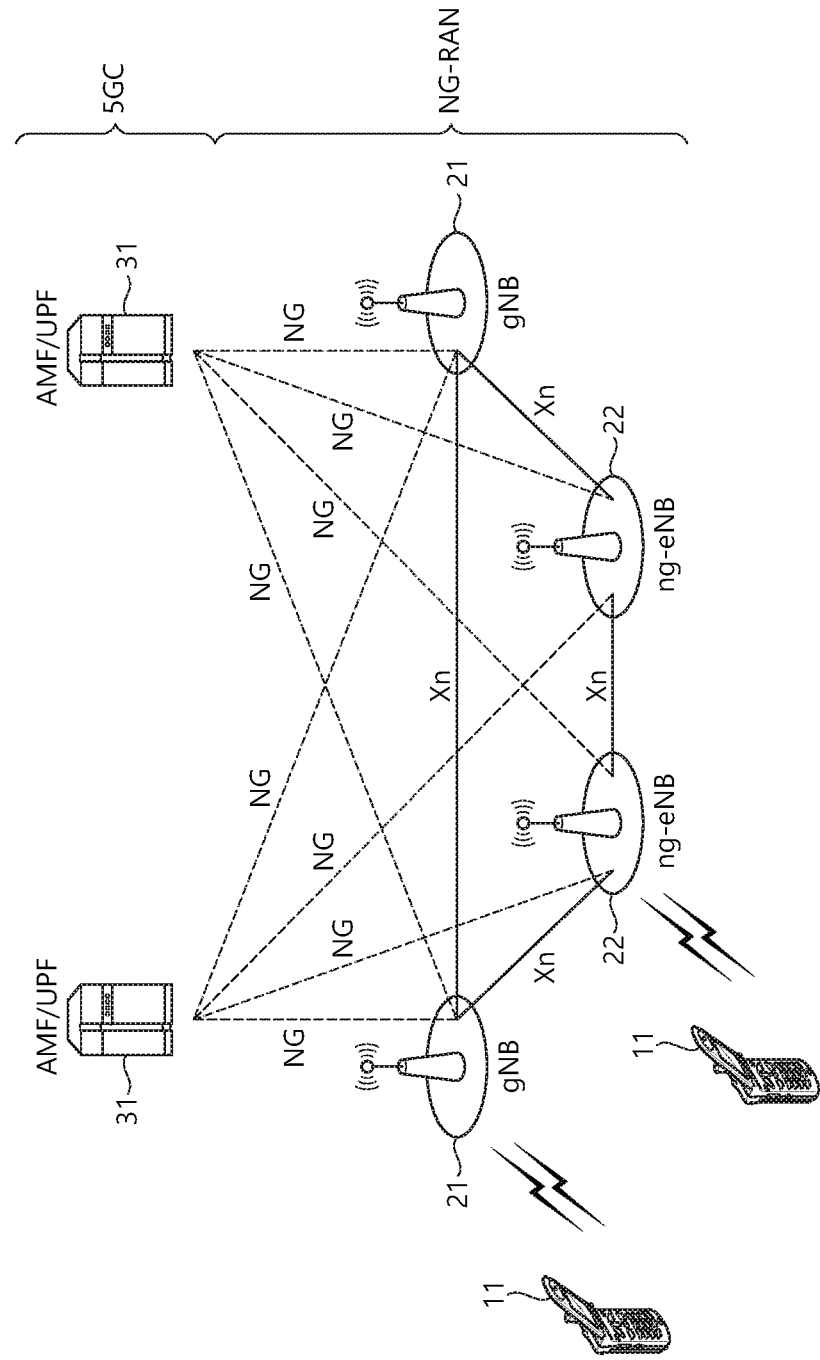
FIG. 2 shows another example of a wireless communication system to which technical features of the present invention can be applied.

FIG. 2 shows another example of a wireless communication system to which technical features of the present invention can be applied. Specifically, FIG. 2 shows a system architecture based on a 5G new radio access technology (NR) system. The entity used in the 5G NR system (hereinafter, simply referred to as "NR") may absorb some or all of the functions of the entities introduced in FIG. 1 (e.g. eNB, MME, S-GW). The entity used in the NR system may be identified by the name "NG" for distinction from the LTE.

In the following description, for NR, 3GPP TS 38 series (3GPP TS 38.211, 38.212, 38.213, 38.214, 38.331, etc.) can be referred to in order to facilitate understanding of the following description.

Referring to FIG. 2, the wireless communication system includes one or more UE 11, a next-generation RAN (NG-RAN) and a 5th generation core network (5GC). The NG-RAN consists of at least one NG-RAN node. The NG-RAN node is an entity corresponding to the BS 20 shown in FIG. 1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

Hereinafter, frame structure/physical resources in NR is described.

In LTE/LTE-A, one radio frame consists of 10 subframes, and one subframe consists of 2 slots. A length of one subframe may be 1 ms, and a length of one slot may be 0.5 ms. Time for transmitting one transport block by higher layer to physical layer (generally over one subframe) is defined as a transmission time interval (TTI). A TTI may be the minimum unit of scheduling.

In NR, DL and UL transmissions are performed over a radio frame with a duration of 10 ms. Each radio frame includes 10 subframes. Thus, one subframe corresponds to 1 ms. Each radio frame is divided into two half-frames.

Unlike LTE/LTE-A, NR supports various numerologies, and accordingly, the structure of the radio frame may be varied. NR supports multiple subcarrier spacings in frequency domain. Table 1 shows multiple numerologies supported in NR. Each numerology may be identified by index $\mu$.

TABLE 1

| μ | Subcarrier spacing (kHz) | Cyclic prefix | Supported for data | Supported for synchronization |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Referring to Table 1, a subcarrier spacing may be set to any one of 15, 30, 60, 120, and 240 kHz, which is identified by index μ. However, subcarrier spacings shown in Table 1 are merely exemplary, and specific subcarrier spacings may be changed. Therefore, each subcarrier spacing (e.g. μ=0, 1 . . . 4) may be represented as a first subcarrier spacing, a second subcarrier spacing . . . Nth subcarrier spacing.

Referring to Table 1, transmission of user data (e.g. physical uplink shared channel (PUSCH), physical downlink shared channel (PDSCH)) may not be supported depending on the subcarrier spacing. That is, transmission of user data may not be supported only in at least one specific subcarrier spacing (e.g. 240 kHz).

In addition, referring to Table 1, a synchronization channel (e.g. a primary synchronization signal (PSS), a secondary synchronization signal (SSS), a physical broadcast channel (PBCH)) may not be supported depending on the subcarrier spacing. That is, the synchronization channel may not be supported only in at least one specific subcarrier spacing (e.g. 60 kHz).

One subframe includes $N_{symb}^{subframe,\mu} = N_{symb}^{slot} * N_{slot}^{subframe,\mu}$ consecutive OFDM symbols. In NR, a number of slots and a number of symbols included in one radio frame/subframe may be different according to various numerologies, i.e. various subcarrier spacings.

Table 2 shows an example of a number of OFDM symbols per slot ($N_{symb}^{slot}$), a number of slots per radio frame ($N_{symb}^{frame,\mu}$), and a number of slots per subframe ($N_{symb}^{subframe,\mu}$) for each numerology in normal cyclic prefix (CP).

TABLE 2

| μ | Number of OFDM symbols per slot ($N_{symb}^{slot}$) | Number of slots per radio frame ($N_{symb}^{frame,\mu}$) | Number of slots per subframe ($N_{symb}^{subframe,\mu}$) |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Referring to Table 2, when a first numerology corresponding to μ=0 is applied, one radio frame includes 10 subframes, one subframe includes to one slot, and one slot consists of 14 symbols.

Table 3 shows an example of a number of OFDM symbols per slot ($N_{symb}^{slot}$), a number of slots per radio frame ($N_{symb}^{frame,\mu}$), and a number of slots per subframe ($N_{symb}^{subframe,\mu}$) for each numerology in extended CP.

TABLE 3

| μ | Number of OFDM symbols per slot ($N_{symb}^{slot}$) | Number of slots per radio frame ($N_{symb}^{frame,\mu}$) | Number of slots per subframe ($N_{symb}^{subframe,\mu}$) |
|---|---|---|---|
| 2 | 12 | 40 | 4 |

Referring to Table 3, μ=2 is only supported in extended CP. One radio frame includes 10 subframes, one subframe includes to 4 slots, and one slot consists of 12 symbols.

In the present specification, a symbol refers to a signal transmitted during a specific time interval. For example, a symbol may refer to a signal generated by OFDM processing. That is, a symbol in the present specification may refer to an OFDM/OFDMA symbol, or SC-FDMA symbol, etc. A CP may be located between each symbol.

Figure 3:
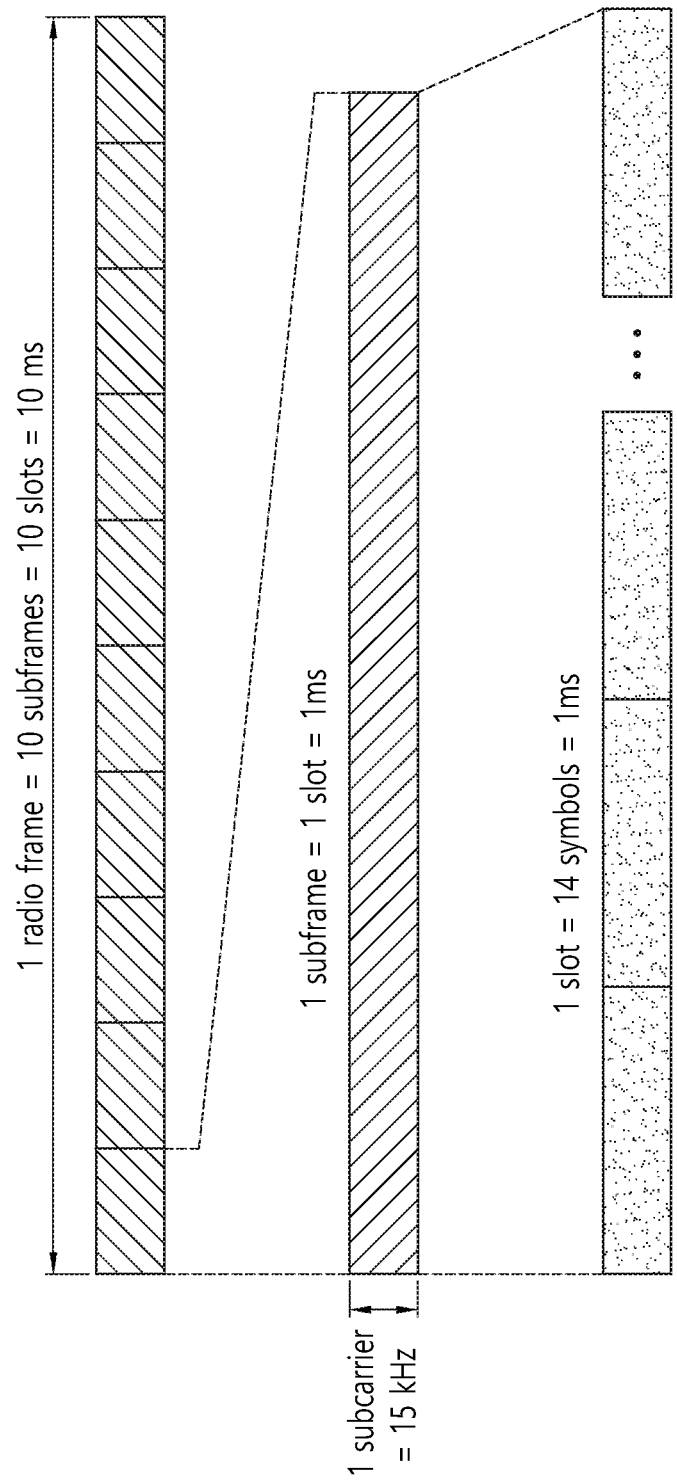
FIG. 3 shows an example of a frame structure to which technical features of the present invention can be applied.

FIG. 3 shows an example of a frame structure to which technical features of the present invention can be applied. In FIG. 3, a subcarrier spacing is 15 kHz, which corresponds to μ=0.

Figure 4:
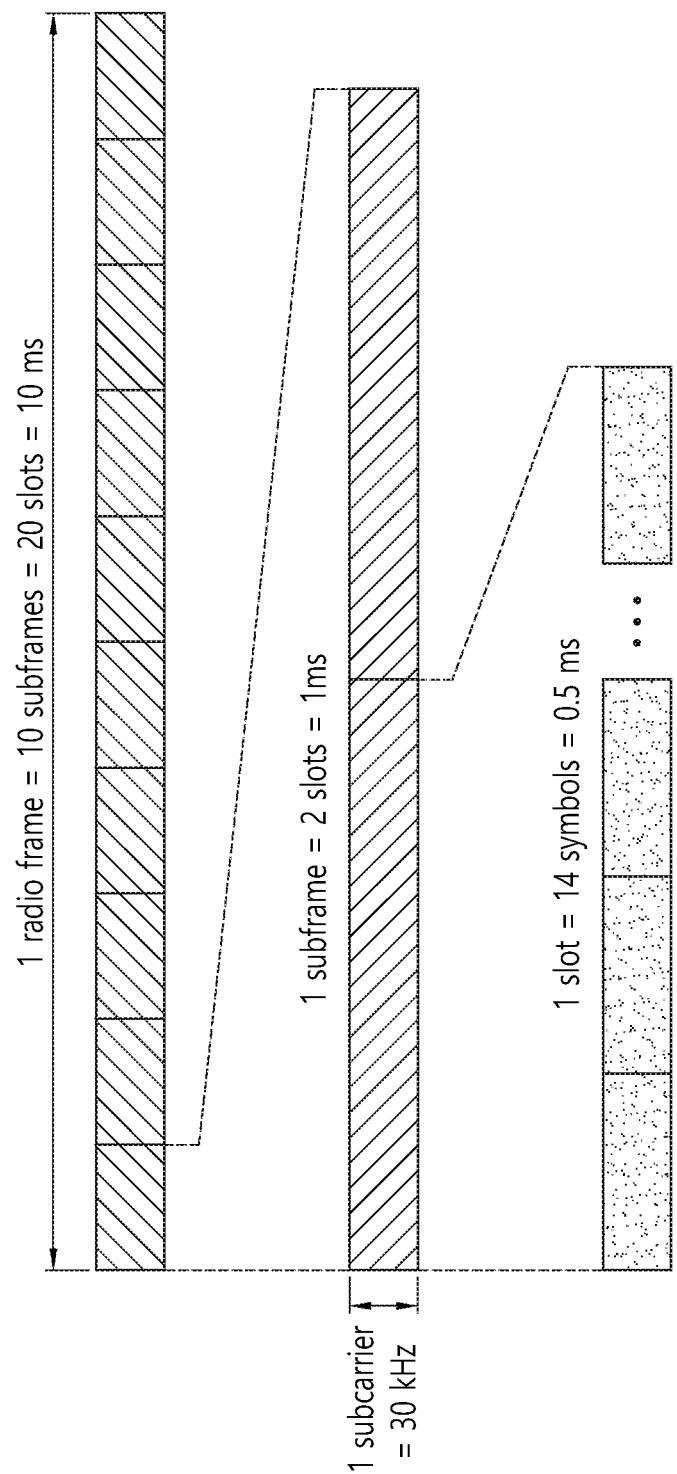
FIG. 4 shows another example of a frame structure to which technical features of the present invention can be applied.

FIG. 4 shows another example of a frame structure to which technical features of the present invention can be applied. In FIG. 4, a subcarrier spacing is 30 kHz, which corresponds to μ=1.

Meanwhile, a frequency division duplex (FDD) and/or a time division duplex (TDD) may be applied to a wireless communication system to which an embodiment of the present invention is applied. When TDD is applied, in LTE/LTE-A, UL subframes and DL subframes are allocated in units of subframes.

In NR, symbols in a slot may be classified as a DL symbol (denoted by D), a flexible symbol (denoted by X), and a UL symbol (denoted by U). In a slot in a DL frame, the UE shall assume that DL transmissions only occur in DL symbols or flexible symbols. In a slot in an UL frame, the UE shall only transmit in UL symbols or flexible symbols. The flexible symbol may be referred to as another terminology, such as reserved symbol, other symbol, unknown symbol, etc.

Table 4 shows an example of a slot format which is identified by a corresponding format index. The contents of the Table 4 may be commonly applied to a specific cell, or may be commonly applied to adjacent cells, or may be applied individually or differently to each UE.

TABLE 4

| For- | Symbol number in a slot | | | | | | | | | | | | | |
|---|---|---|---|---|---|---|---|---|---|---|---|---|---|---|
| mat | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| ... | | | | | | | | | | | | | | |

For convenience of explanation, Table 4 shows only a part of the slot format actually defined in NR. The specific allocation scheme may be changed or added.

The UE may receive a slot format configuration via a higher layer signaling (i.e. radio resource control (RRC) signaling). Or, the UE may receive a slot format configuration via downlink control information (DCI) which is received on PDCCH. Or, the UE may receive a slot format configuration via combination of higher layer signaling and DCI.

Figure 5:
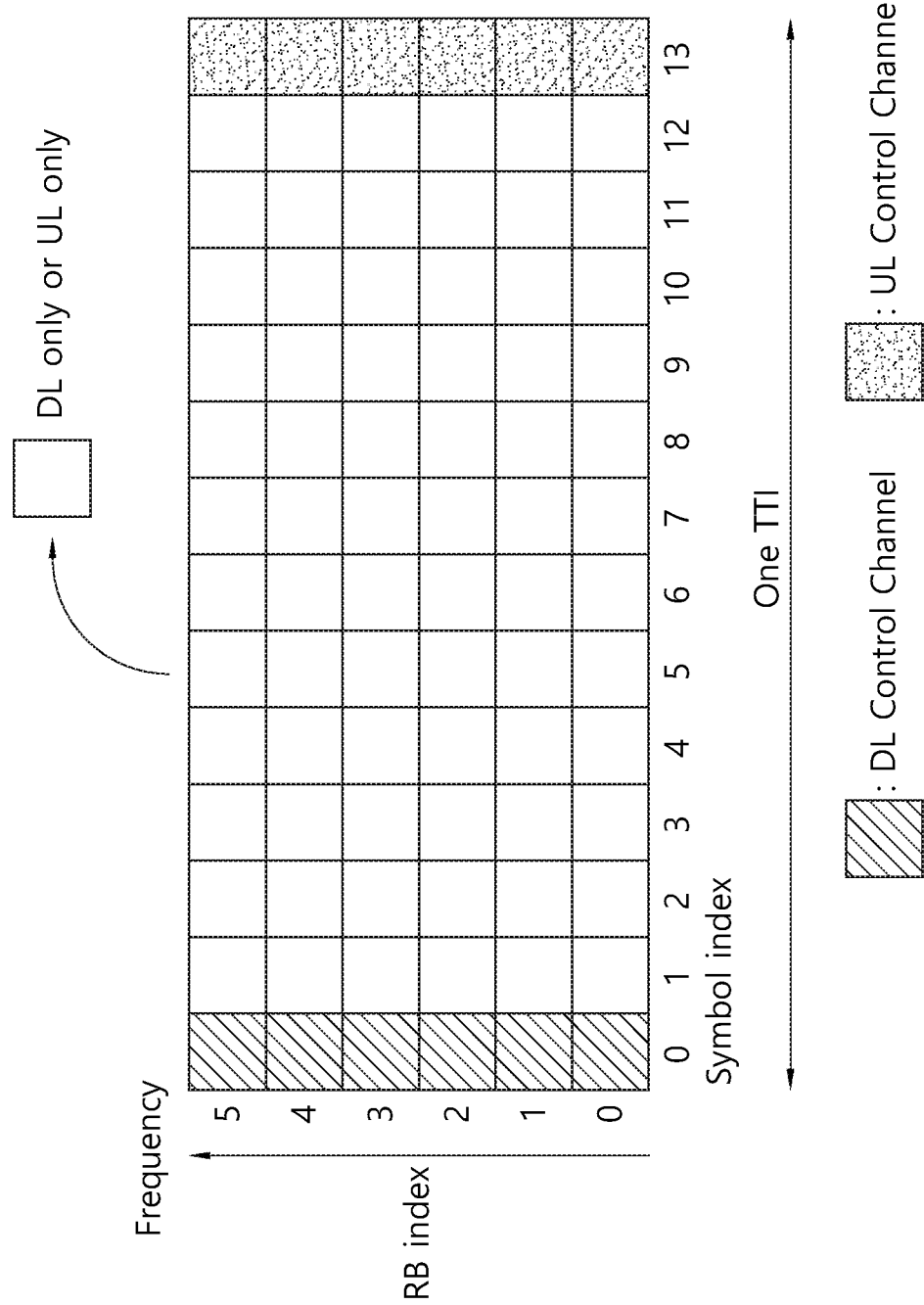
FIG. 5 shows an example of a subframe structure used to minimize latency of data transmission when TDD is used in NR.

FIG. 5 shows an example of a subframe structure used to minimize latency of data transmission when TDD is used in NR. The subframe structure shown in FIG. 5 may be called a self-contained subframe structure.

Referring to FIG. 5, the subframe includes DL control channel in the first symbol, and UL control channel in the last symbol. The remaining symbols may be used for DL data transmission and/or for UL data transmission. According to this subframe structure, DL transmission and UL transmission may sequentially proceed in one subframe. Accordingly, the UE may both receive DL data and transmit UL acknowledgement/non-acknowledgement (ACK/NACK) in the subframe. As a result, it may take less time to retransmit data when a data transmission error occurs, thereby minimizing the latency of final data transmission.

In the self-contained subframe structure, a time gap may be required for the transition process from the transmission mode to the reception mode or from the reception mode to the transmission mode. For this purpose, some symbols at the time of switching from DL to UL in the subframe structure may be set to the guard period (GP).

Figure 6:
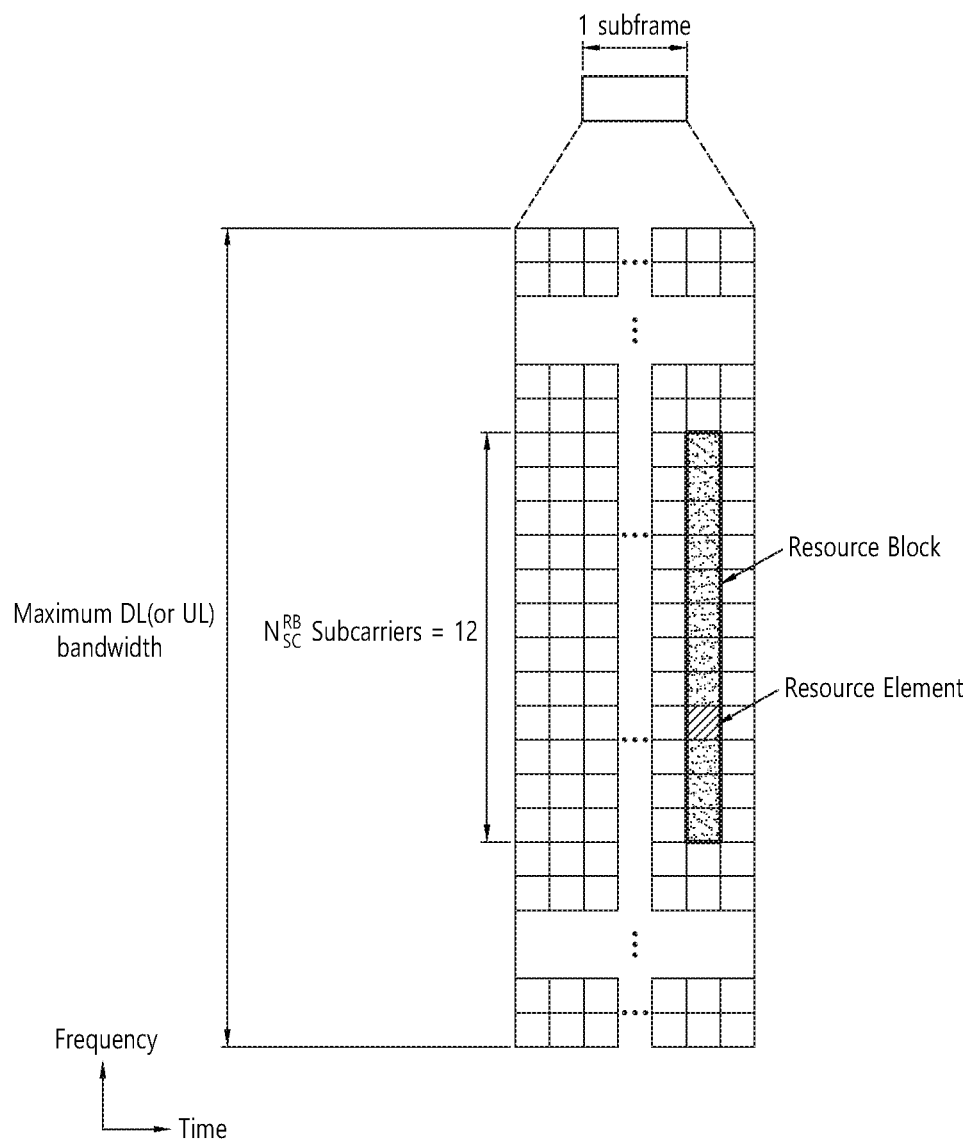
FIG. 6 shows an example of a resource grid to which technical features of the present invention can be applied.

FIG. 6 shows an example of a resource grid to which technical features of the present invention can be applied. An example shown in FIG. 6 is a time-frequency resource grid used in NR. An example shown in FIG. 6 may be applied to UL and/or DL.

Referring to FIG. 6, multiple slots are included within one subframe on the time domain. Specifically, when expressed according to the value of "$\mu$", "14.2p" symbols may be expressed in the resource grid. Also, one resource block (RB) may occupy 12 consecutive subcarriers. One RB may be referred to as a physical resource block (PRB), and 12 resource elements (REs) may be included in each PRB. The number of allocatable RBs may be determined based on a minimum value and a maximum value. The number of allocatable RBs may be configured individually according to the numerology ("$\mu$"). The number of allocatable RBs may be configured to the same value for UL and DL, or may be configured to different values for UL and DL.

Hereinafter, a cell search in NR is described.

The UE may perform cell search in order to acquire time and/or frequency synchronization with a cell and to acquire a cell identifier (ID). Synchronization channels such as PSS, SSS, and PBCH may be used for cell search.

Figure 7:
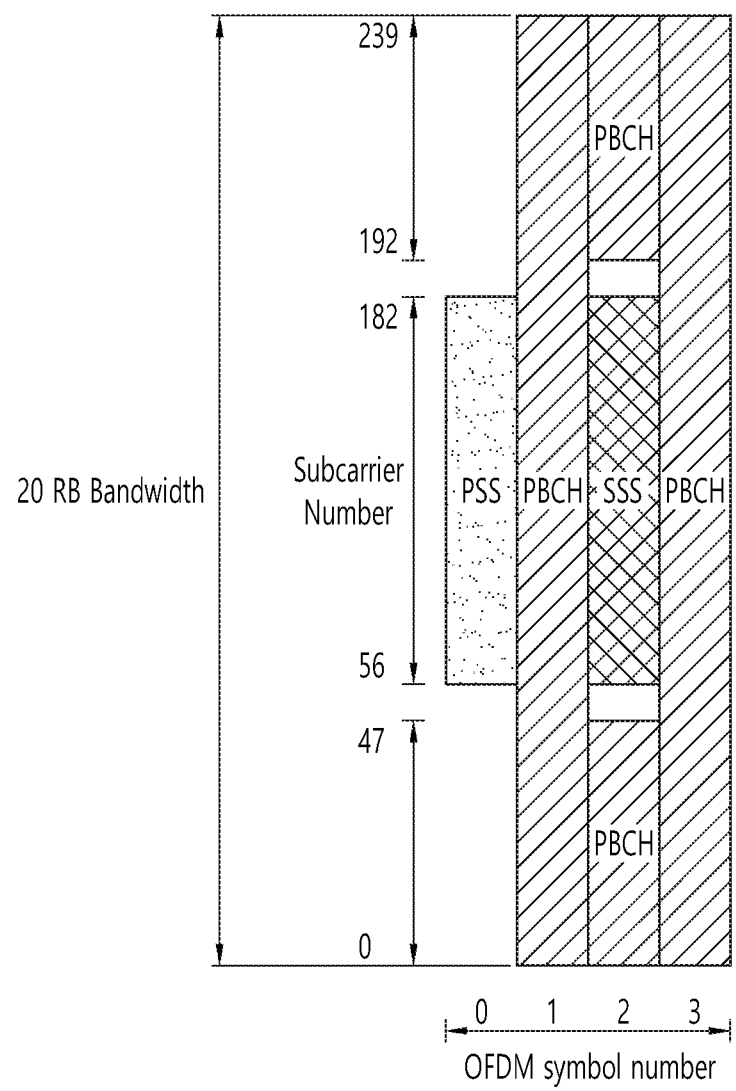
FIG. 7 shows an example of a synchronization channel to which technical features of the present invention can be applied.

FIG. 7 shows an example of a synchronization channel to which technical features of the present invention can be applied. Referring to FIG. 7, the PSS and SSS may include one symbol and 127 subcarriers. The PBCH may include 3 symbols and 240 subcarriers.

The PSS is used for synchronization signal (SS)/PBCH block symbol timing acquisition. The PSS indicates 3 hypotheses for cell ID identification. The SSS is used for cell ID identification. The SSS indicates 336 hypotheses. Consequently, 1008 physical layer cell IDs may be configured by the PSS and the SSS.

The SS/PBCH block may be repeatedly transmitted according to a predetermined pattern within the 5 ms window. For example, when L SS/PBCH blocks are transmitted, all of SS/PBCH block #1 through SS/PBCH block #L may contain the same information, but may be transmitted through beams in different directions. That is, quasi co-located (QCL) relationship may not be applied to the SS/PBCH blocks within the 5 ms window. The beams used to receive the SS/PBCH block may be used in subsequent operations between the UE and the network (e.g. random access operations). The SS/PBCH block may be repeated by a specific period. The repetition period may be configured individually according to the numerology.

Referring to FIG. 7, the PBCH has a bandwidth of 20 RBs for the 2nd/4th symbols and 8 RBs for the 3rd symbol. The PBCH includes a demodulation reference signal (DM-RS) for decoding the PBCH. The frequency domain for the DM-RS is determined according to the cell ID. Unlike LTE/LTE-A, since a cell-specific reference signal (CRS) is not defined in NR, a special DM-RS is defined for decoding the PBCH (i.e. PBCH-DMRS). The PBCH-DMRS may contain information indicating an SS/PBCH block index.

The PBCH performs various functions. For example, the PBCH may perform a function of broadcasting a master information block (MIB). System information (SI) is divided into a minimum SI and other SI. The minimum SI may be divided into MIB and system information block type-1 (SIB1). The minimum SI excluding the MIB may be referred to as a remaining minimum SI (RMSI). That is, the RMSI may refer to the SIB 1.

The MIB includes information necessary for decoding SIB 1. For example, the MIB may include information on a subcarrier spacing applied to SIB1 (and MSG 2/4 used in the random access procedure, other SI), information on a frequency offset between the SS/PBCH block and the subsequently transmitted RB, information on a bandwidth of the PDCCH/SIB, and information for decoding the PDCCH (e.g. information on search-space/control resource set (CORESET)/DM-RS, etc., which will be described later). The MIB may be periodically transmitted, and the same information may be repeatedly transmitted during 80 ms time interval. The SIB1 may be repeatedly transmitted through the PDSCH. The SIB1 includes control information for initial access of the UE and information for decoding another SIB.

Hereinafter, DL control channel in NR is described.

The search space for the PDCCH corresponds to aggregation of control channel candidates on which the UE performs blind decoding. In LTE/LTE-A, the search space for the PDCCH is divided into a common search space (CSS) and a UE-specific search space (USS). The size of each search space and/or the size of a control channel element (CCE) included in the PDCCH are determined according to the PDCCH format.

In NR, a resource-element group (REG) and a CCE for the PDCCH are defined. In NR, the concept of CORESET is defined. Specifically, one REG corresponds to 12 REs, i.e. one RB transmitted through one OFDM symbol. Each REG includes a DM-RS. One CCE includes a plurality of REGs (e.g. 6 REGs). The PDCCH may be transmitted through a resource consisting of 1, 2, 4, 8, or 16 CCEs. The number of CCEs may be determined according to the aggregation level. That is, one CCE when the aggregation level is 1, 2 CCEs when the aggregation level is 2, 4 CCEs when the aggregation level is 4, 8 CCEs when the aggregation level is 8, 16 CCEs when the aggregation level is 16, may be included in the PDCCH for a specific UE.

The CORESET is a set of resources for control signal transmission. The CORESET may be defined on 1/2/3 OFDM symbols and multiple RBs. In LTE/LTE-A, the number of symbols used for the PDCCH is defined by a physical control format indicator channel (PCFICH). However, the PCFICH is not used in NR. Instead, the number of symbols used for the CORESET may be defined by the RRC message (and/or PBCH/SIB1). Also, in LTE/LTE-A, since the frequency bandwidth of the PDCCH is the same as the entire system bandwidth, so there is no signaling regarding the frequency bandwidth of the PDCCH. In NR, the frequency domain of the CORESET may be defined by the RRC message (and/or PBCH/SIB1) in a unit of RB.

The base station may transmit information on the CORESET to the UE. For example, information on the CORESET configuration may be transmitted for each CORESET. Via the information on the CORESET configuration, at least one of a time duration of the corresponding CORESET (e.g. 1/2/3 symbol), frequency domain resources (e.g. RB set), REG-to-CCE mapping type (e.g. whether interleaving is applied or not), precoding granularity, a REG bundling size (when the REG-to-CCE mapping type is interleaving), an interleaver size (when the REG-to-CCE mapping type is interleaving) and a DMRS configuration (e.g. scrambling ID) may be transmitted. When interleaving to distribute the CCE to 1-symbol CORESET is applied, bundling of two or six REGs may be performed. Bundling of two or six REGs may be performed on the two symbols CORESET, and time first mapping may be applied. Bundling of three or six REGs may be performed on the three symbols CORESET, and a time first mapping may be applied. When REG bundling is performed, the UE may assume the same precoding for the corresponding bundling unit.

In NR, the search space for the PDCCH is divided into CSS and USS. The search space may be configured in CORESET. As an example, one search space may be defined in one CORESET. In this case, CORESET for CSS and CORESET for USS may be configured, respectively. As another example, a plurality of search spaces may be defined in one CORESET. That is, CSS and USS may be configured in the same CORESET. In the following example, CSS means CORESET in which CSS is configured, and USS means CORESET in which USS is configured. Since the USS may be indicated by the RRC message, an RRC connection may be required for the UE to decode the USS. The USS may include control information for PDSCH decoding assigned to the UE.

Since the PDCCH needs to be decoded even when the RRC configuration is not completed, CSS should also be defined. For example, CSS may be defined when a PDCCH for decoding a PDSCH that conveys SIB1 is configured or when a PDCCH for receiving MSG 2/4 is configured in a random access procedure. Like LTE/LTE-A, in NR, the PDCCH may be scrambled by a radio network temporary identifier (RNTI) for a specific purpose.

A resource allocation in NR is described.

In NR, a specific number (e.g. up to 4) of bandwidth parts (BWPs) may be defined. A BWP (or carrier BWP) is a set of consecutive PRBs, and may be represented by a consecutive subsets of common RBs (CRBs). Each RB in the CRB may be represented by CRB1, CRB2, etc., beginning with CRB0.

Figure 8:
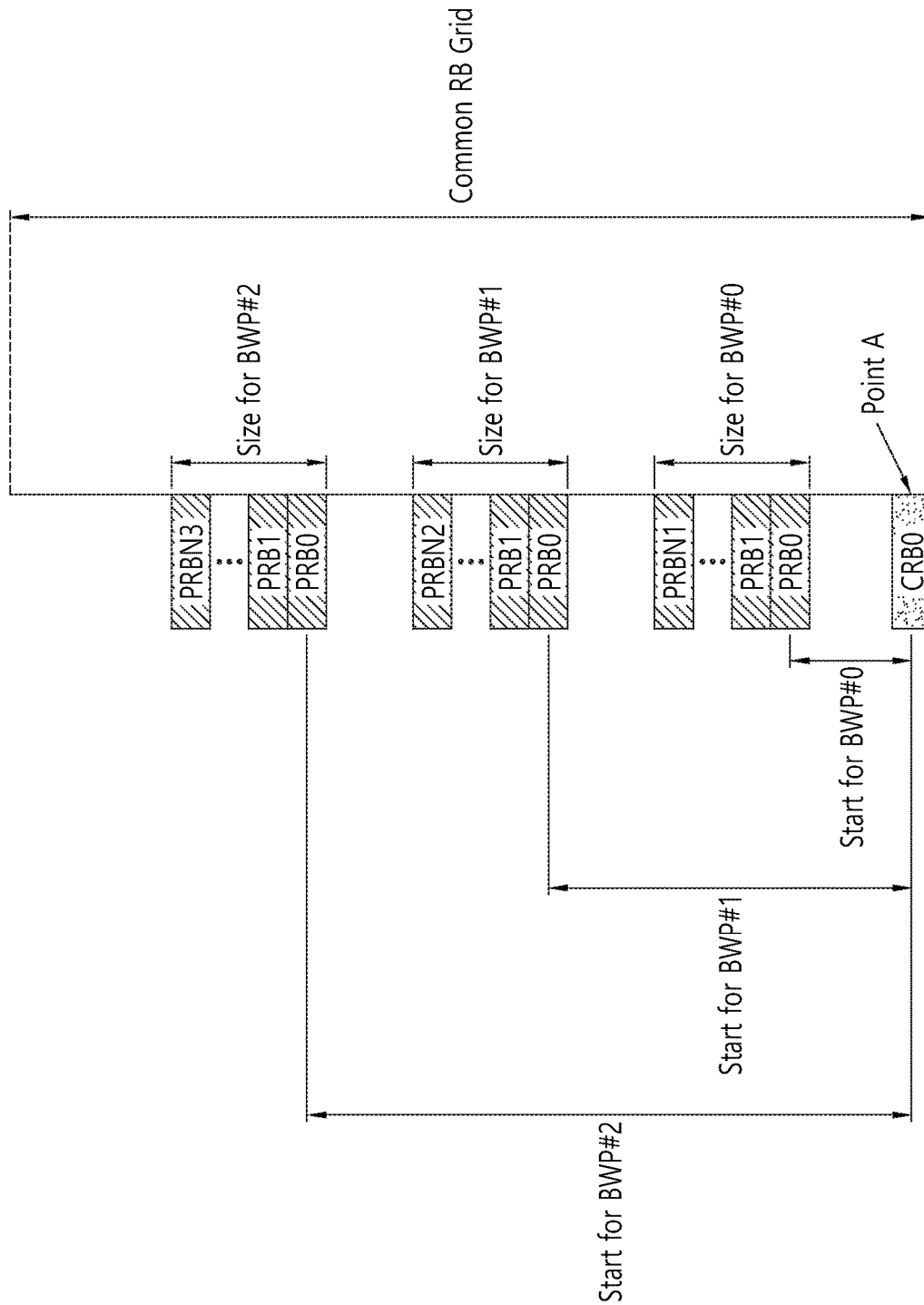
FIG. 8 shows an example of a frequency allocation scheme to which technical features of the present invention can be applied.

FIG. 8 shows an example of a frequency allocation scheme to which technical features of the present invention can be applied.

Referring to FIG. 8, multiple BWPs may be defined in the CRB grid. A reference point of the CRB grid (which may be referred to as a common reference point, a starting point, etc.) is referred to as so-called "point A" in NR. The point A is indicated by the RMSI (i.e. SIB1). Specifically, the frequency offset between the frequency band in which the SS/PBCH block is transmitted and the point A may be indicated through the RMSI. The point A corresponds to the center frequency of the CRB0. Further, the point A may be a point at which the variable "k" indicating the frequency band of the RE is set to zero in NR. The multiple BWPs shown in FIG. 8 is configured to one cell (e.g. primary cell (PCell)). A plurality of BWPs may be configured for each cell individually or commonly.

Referring to FIG. 8, each BWP may be defined by a size and starting point from CRB0. For example, the first BWP, i.e. BWP #0, may be defined by a starting point through an offset from CRB0, and a size of the BWP #0 may be determined through the size for BWP #0.

A specific number (e.g. up to four) of BWPs may be configured for the UE. Even if a plurality of BWPs are configured, only a specific number (e.g. one) of BWPs may be activated per cell for a given time period. However, when the UE is configured with a supplementary uplink (SUL) carrier, maximum of four BWPs may be additionally configured on the SUL carrier and one BWP may be activated for a given time. The number of configurable BWPs and/or the number of activated BWPs may be configured commonly or individually for UL and DL. Also, the numerology and/or CP for the DL BWP and/or the numerology and/or CP for the UL BWP may be configured to the UE via DL signaling. The UE can receive PDSCH, PDCCH, channel state information (CSI) RS and/or tracking RS (TRS) only on the active DL BWP. Also, the UE can transmit PUSCH and/or physical uplink control channel (PUCCH) only on the active UL BWP.

Figure 9:
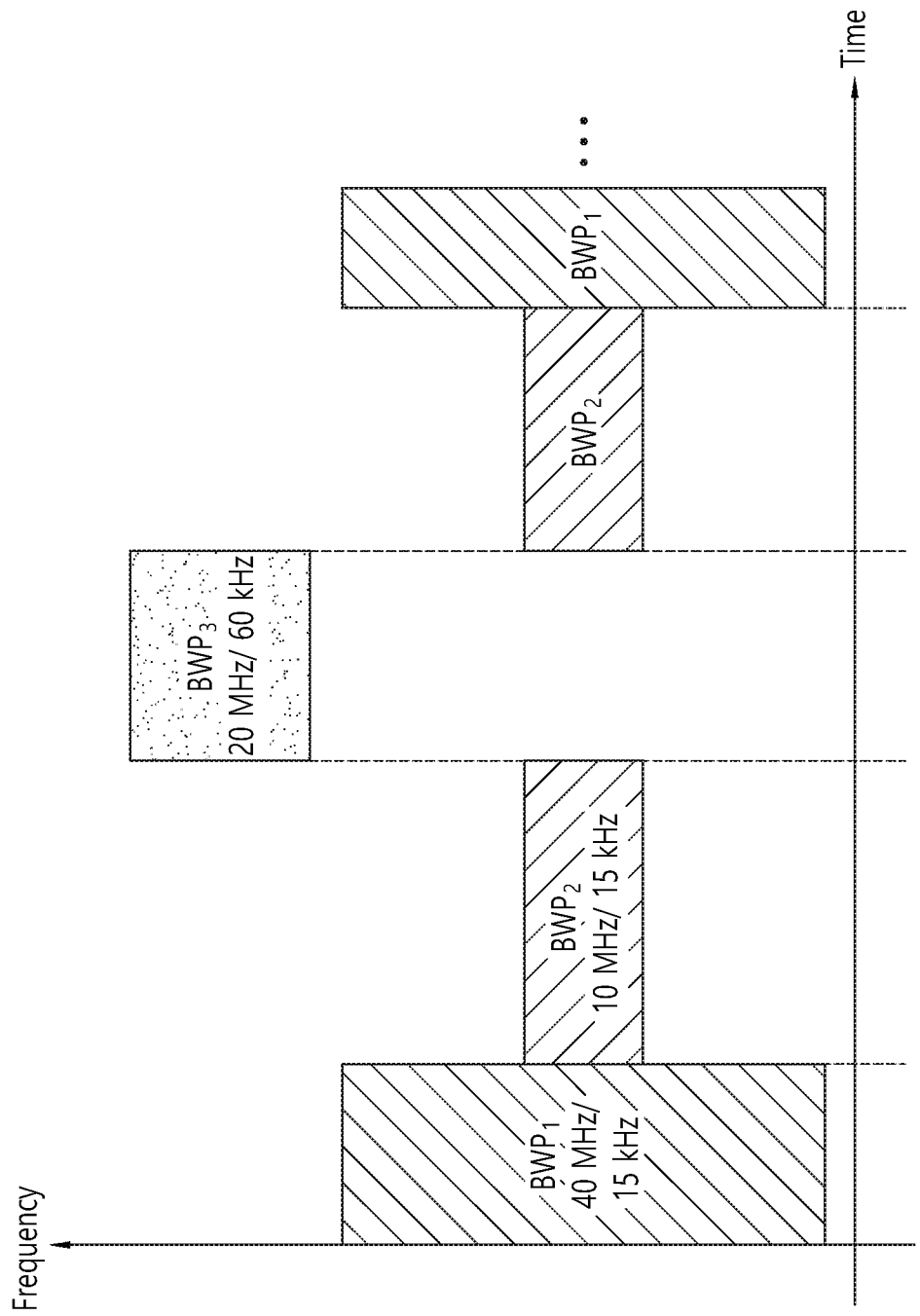
FIG. 9 shows an example of multiple BWPs to which technical features of the present invention can be applied.

FIG. 9 shows an example of multiple BWPs to which technical features of the present invention can be applied.

Referring to FIG. 9, 3 BWPs may be configured. The first BWP may span 40 MHz band, and a subcarrier spacing of 15 kHz may be applied. The second BWP may span 10 MHz band, and a subcarrier spacing of 15 kHz may be applied. The third BWP may span 20 MHz band and a subcarrier spacing of 60 kHz may be applied. The UE may configure at least one BWP among the 3 BWPs as an active BWP, and may perform UL and/or DL data communication via the active BWP.

A time resource may be indicated in a manner that indicates a time difference/offset based on a transmission time point of a PDCCH allocating DL or UL resources. For example, the start point of the PDSCH/PUSCH corresponding to the PDCCH and the number of symbols occupied by the PDSCH/PUSCH may be indicated.

Carrier aggregation (CA) is described. Like LTE/LTE-A, CA can be supported in NR. That is, it is possible to aggregate continuous or discontinuous component carriers (CCs) to increase the bandwidth and consequently increase the bit rate. Each CC may correspond to a (serving) cell, and each CC/cell may be divided into a primary serving cell (PSC)/primary CC (PCC) or a secondary serving cell (SSC)/secondary CC (SCC).

Table 5 shows spectrum utilization in the frequency band below 6 GHz. A frequency band below 6 GHz may be referred to as frequency range 1 (FR1). Table 5 shows the number of RBs according to the bandwidth supported by FR1.

TABLE 5

| SCS [kHz] | 5 MHz $N_{RB}$ | 10 MHz $N_{RB}$ | 15 MHz $N_{RB}$ | 20 MH $N_{RB}$ | 25 MHz $N_{RB}$ | 40 MHz $N_{RB}$ | 50 MHz $N_{RB}$ | 60 MHz $N_{RB}$ | 80 MHz $N_{RB}$ | 100 MHz $N_{RB}$ |
|---|---|---|---|---|---|---|---|---|---|---|
| 15 | 25 | 52 | 79 | 106 | 133 | 216 | 270 | N.A | N.A | N.A |
| 30 | 11 | 24 | 38 | 51 | 65 | 106 | 133 | 162 | 217 | 273 |
| 60 | N.A | 11 | 18 | 24 | 31 | 51 | 65 | 79 | 107 | 135 |

Table 6 shows spectrum utilization in the frequency band below millimeter wave (mmWave). A frequency band below mmWave may be referred to as frequency range 2 (FR2). Table 6 shows the number of RBs according to the bandwidth supported by FR2.

TABLE 6

| SCS [kHz] | 50 MHz $N_{RB}$ | 100 MHz $N_{RB}$ | 200 MHz $N_{RB}$ | 400 MHz $N_{RB}$ |
|---|---|---|---|---|
| 60 | 66 | 132 | 264 | N.A |
| 120 | 32 | 66 | 132 | 264 |

PRB utilization is the set of PRBs that fall within the UE or BS channel bandwidth and do not violate the minimum guard.

Table 7 shows the minimum guard size (kHz) for FR1. Table 7 shows the minimum guard size according to the bandwidth supported by FR1. The guard is located from the last PRB to channel bandwidth edge, on each side of the carrier.

TABLE 7

| SCS [kHz] | 5 MHz kHz | 10 MHz kHz | 15 MHz kHz | 20 MHz kHz | 25 MHz kHz | 30 MHz kHz | 40 MHz kHz | 50 MHz kHz | 60 MHz kHz | 70 MHz kHz | 80 MHz kHz | 90 MHz kHz | 100 MHz kHz |
|---|---|---|---|---|---|---|---|---|---|---|---|---|---|
| 15 | 242.5 | 312.5 | 382.5 | 452.5 | 522.5 | [592.5] | 552.5 | 692.5 | N.A | N.A | N.A | N.A | N.A |
| 30 | 505 | 665 | 645 | 805 | 785 | [945] | 905 | 1045 | 825 | [965] | 925 | [885] | 845 |
| 60 | N.A | 1010 | 990 | 1330 | 1310 | [1290] | 1610 | 1570 | 1530 | [1490] | 1450 | [1410] | 1370 |

Table 8 shows the minimum guard size (kHz) for FR2. Table 8 shows the minimum guard size according to the bandwidth supported by FR2.

TABLE 8

| SCS [kHz] | 50 MHz kHz | 100 MHz kHz | 200 MHz kHz | 400 MHz kHz |
|---|---|---|---|---|
| 60 | 1210 | 2450 | 4930 | N.A |
| 120 | 1900 | 2420 | 4900 | 9860 |

Actual spectrum utilization depends on RB alignment in the channel and may result in 1 RB less than the number in Table 5 and Table 6.

To support different numerologies effectively, in NR, it is assumed that subcarrier 0 of each numerology is aligned. While maximizing spectral efficiency (and thus meeting the required minimum guard band) and balancing guard bands symmetrically, it is also necessary to align PRB grid of different numerologies.

Figure 10:
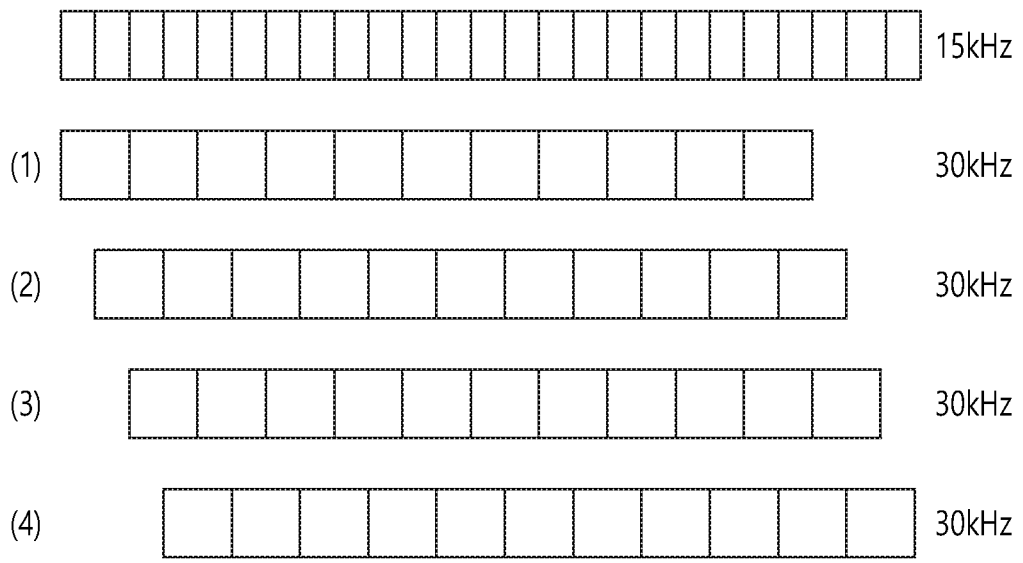
FIG. 10 shows an example of aligning PRB grids of different numerologies.

FIG. 10 shows an example of aligning PRB grids of different numerologies. Referring to FIG. 10, there is shown different examples in which 25 RBs of a first numerology corresponding to 15 kHz subcarrier spacing and 11 RBs of a second numerology corresponding to 30 kHz subcarrier spacing are aligned. A PRB grid of subcarrier spacing of 30 kHz may be shifted to align 25 RBs of the subcarrier spacing of 15 kHz and 11 RBs of the subcarrier spacing of 30 kHz. In this regard, it can be discussed if all the PRB grid shifts for all subcarrier spacings higher than the reference subcarrier spacing are supported and whether there are further constraints on the PRB alignment for different subcarrier spacings.

When different PRB grids among different numerologies are considered, a base frequency may be considered in terms of baseband signal generation. The base frequency may be half point of carrier bandwidth per given numerology or the lowest subcarrier of each carrier per given numerology. Or, the base frequency may also be half point of UE's active BWP per given numerology or the lowest subcarrier of UE's active BWP per given numerology. FFT may assume zero or center frequency for the base frequency.

In NR, due to various scenarios such as BWP operation, wideband operation, multiple numerologies, etc., signal generation/reception may be based on each device's center frequency instead of aligned center frequency (e.g. center frequency of a carrier as in LTE). However, to compensate the phase, a common reference between the network and UE may still be needed. The common reference may be absolute frequency 0 or the starting frequency for each frequency region or a fixed set of values per frequency range (e.g. 0 for FR1, 24000 MHz for FR2) or a starting frequency for each frequency band.

In other words, signal may be generated based on the common reference by pre-compensating offset between transmitter's center frequency and the reference frequency.

For the convenience in the description below, transmitter's center frequency may be called as 'F0', and base frequency of baseband signal generation may be called as 'd0'.

Considering multiple numerologies, depending on scenarios, for each numerology, PRB grid (i.e. guardband) may not be fixed relative to location of SS/PBCH block. For example, referring to FIG. 10 shown above, if PRB grid of 15 kHz subcarrier spacing has larger guard band in left, it is desirable to use (2) for PRB grid of 30 kHz subcarrier spacing to balance symmetric guard band. On the other hand, if PRB grid of 15 kHz subcarrier spacing has larger guard band in right, it is desirable to use (3) for PRB grid of 30 kHz subcarrier spacing. In other words, depending on the frequency band, to balance the guard band for each numerology, the optimal PRB grid mapping can be different. Depending on case, the offset between Point A (a point where subcarrier 0 of all numerologies are aligned) and the lowest subcarrier (or the center subcarrier) of each carrier of a given numerology may be different.

According to an embodiment of the present invention, in signal generation for multiple numerologies, the following two approaches may be considered.

(1) Approach 1: F0 for each numerology may be aligned. Or, d0 for each numerology may be aligned. For example, by using the center frequency of smallest or largest subcarrier spacing that the network supports or the band supports as the common reference, F0 or d0 for each numerology may be aligned with each other.

(2) Approach 2: F0 or d0 for each numerology may be determined based on PRB grid of each numerology. Accordingly, F0 or d0 for each numerology may be different between different numerologies. F0 or d0 for each numerology may not be aligned with each other.

Figure 11:
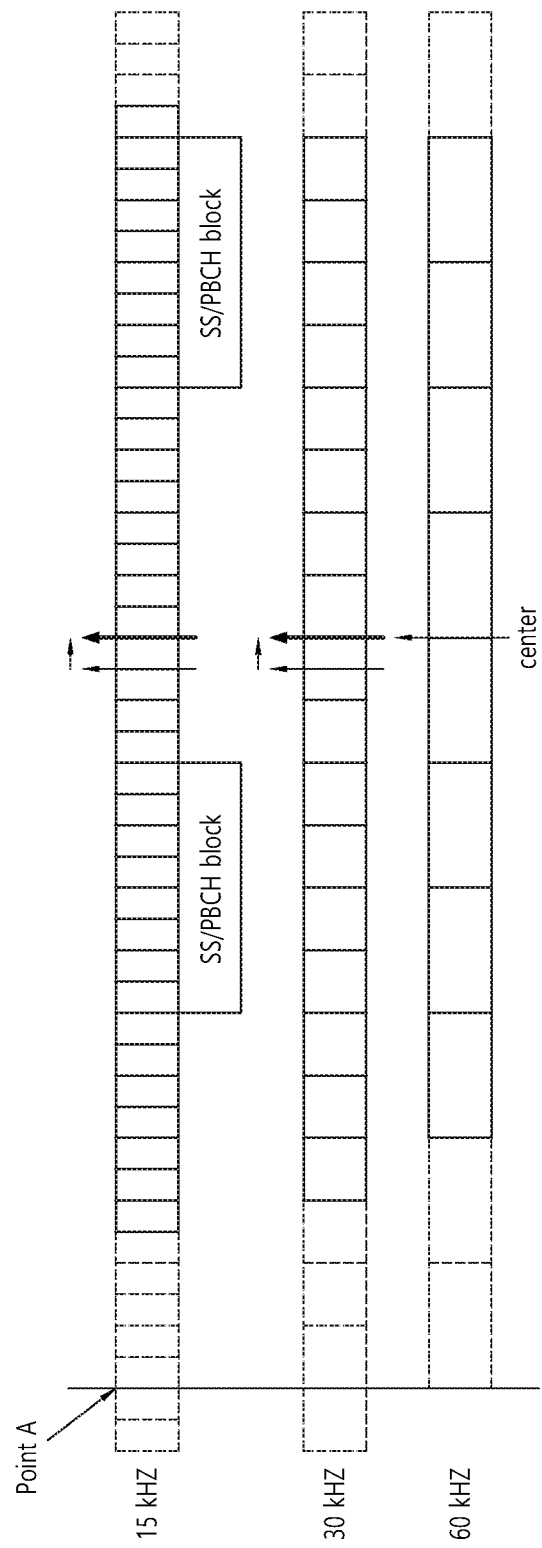
FIG. 11 shows an example of a method for generating signal for a plurality of numerologies according to an embodiment of the present invention.

FIG. 11 shows an example of a method for generating signal for a plurality of numerologies according to an embodiment of the present invention. In FIG. 11, it is assumed that the subcarrier spacings supported by the network or bandwidth are 15 kHz, 30 kHz, 60 kHz, and the largest subcarrier spacing supported by the network or bandwidth is 60 kHz. The SS/PBCH block may be transmitted using a subcarrier spacing of 15 KHz. A PRB grid may be generated for each numerology, and at point A, the subcarrier 0 is aligned in the PRB grid for all the numerologies. Referring to FIG. 11, the center frequencies (F0) of the PRB grid for each numerology and/or the reference frequency (d0) of baseband signal generation for each numerology may be aligned based on a common reference for signal generation for each new numerology. Referring to FIG. 11, the center frequency of the subcarrier spacing of 60 kHz, which is the largest subcarrier spacing supported by the network or bandwidth, may be used as the common reference. That is, in a PBB grid for subcarrier spacing less than 60 kHz, i.e. a 30 kHz or 15 kHz subcarrier spacing, the center frequency may be shifted/aligned based on the center frequency of the subcarrier spacing of 60 kHz. Depending on the center frequency for each numerology, d0, the reference frequency (d0) of baseband signal generation may be determined. Or, in a PBB grid for subcarrier spacing less than 60 kHz, i.e. a 30 kHz or 15 kHz subcarrier spacing, the reference frequency (d0) of baseband signal generation may be shifted/aligned based on the center frequency of the subcarrier spacing of 60 kHz.

Figure 12:
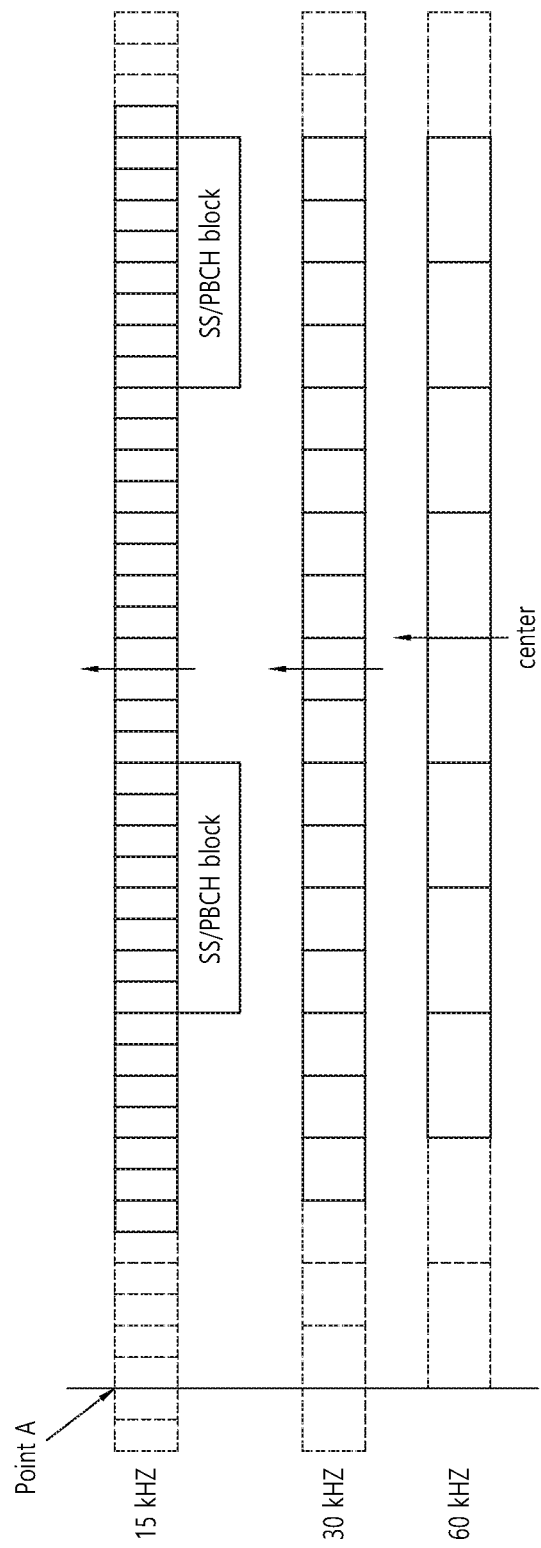
FIG. 12 shows an example of a method for generating signal for a plurality of numerologies according to another embodiment of the present invention.

FIG. 12 shows an example of a method for generating signal for a plurality of numerologies according to another embodiment of the present invention. In FIG. 12, it is assumed that the subcarrier spacings supported by the network or bandwidth are 15 kHz, 30 kHz, 60 kHz, and the largest subcarrier spacing supported by the network or bandwidth is 60 kHz. The SS/PBCH block may be transmitted using a subcarrier spacing of 15 KHz. A PRB grid may be generated for each numerology, and at point A, the subcarrier 0 is aligned in the PRB grid for all the numerologies. Referring to FIG. 12, the center frequencies (F0) of the PRB grids for each numerology and/or the reference frequency (d0) of baseband signal generation for each numerology are not aligned with each other. In other words, F0 or d0 for each numerology may be determined based on the PRB grid of each numerology. Unlike FIG. 11, in a PBB grid for subcarrier spacing less than 60 kHz, i.e. a 30 kHz or 15 kHz subcarrier spacing, the center frequency and/or reference frequency of baseband signal generation is not shifted/aligned based on the center frequency of the subcarrier spacing of 60 kHz.

Approach 1 has benefit of aligned center frequency between different numerologies. That is, baseband signal generation can be performed based on the aligned center frequency. This approach can be effectively used for frequency division multiplexing (FDM) among different numerologies and fast time division multiplexing (TDM) between different numerologies. However, Approach 1 needs to determine the common reference frequency among different numerologies, and potentially, different center frequency for each numerology may need to be compensated.

In current NR specification, a UE is indicated with Point A (where subcarrier 0 of each numerology PRB grid is aligned), and the offset between Point A and the lowest subcarrier of a carrier of a given numerology, and the number of RBs of the carrier. To determine the common reference frequency, a specific rule may be needed. For example, the common reference frequency may be center frequency of PRB grid for the largest subcarrier spacing or the smallest subcarrier spacing supported by the network in the same frequency band. Or, the common reference frequency may be center frequency of PRB grid for a fixed subcarrier spacing (e.g. 15 kHz for FR1, 60 kHz for FR2). If the center frequency of PRB grid for the largest or smallest subcarrier spacing is used as the common reference frequency, the difference between computed center frequency for each numerology and the common reference frequency may need to be signaled or computed. The center frequency for each numerology may be computed based on the lowest subcarrier and the number of RBs for the carrier with the numerology. In other words, the center of carrier's PRB grid may be the computed center frequency which is derived from the offset between Point A and the lowest subcarrier of the carrier, and the number of RBs for the carrier.

If all carriers' supported numerologies are not signaled, the difference between center frequency for each numerology and the common reference frequency may need to be signaled instead. Depending on which one is used as a reference, different signaling may be needed. For example, if the center frequency of PRB grid for the smallest subcarrier spacing is used as the common reference frequency, the difference value for each numerology may be {−6, −3, 0, 3, 6}, if the largest subcarrier spacing is 4*smallest subcarrier spacing. If the center frequency of PRB grid for the largest subcarrier spacing is used as the common reference frequency, the difference value for each numerology can be {−12, −6, 0, 6, 12}, if the largest subcarrier spacing is 4*smallest subcarrier spacing. If the largest subcarrier spacing is larger than 4*smallest subcarrier spacing, different values such as −1.5 may be needed for Approach 1, which may not be desirable. In such a case, Approach 2 may need to be used. The same set of value may be needed if the lowest subcarrier of a carrier is used as d0.

When Approach 1 is used, signal generation and up-conversion may have following options.

(1) Option 1: 'd0' for signal generation of a numerology may be compensated/determined based on the common reference frequency. To allow the same up-conversion frequency, signal generation of each numerology may determine d0 based on the common reference frequency, i.e. the aligned center frequency (F0). This option can be understood as mapping resources based on virtual center, which is the common reference frequency for the supported numerologies instead of the computed center based on PRB grid of each numerology. From resource mapping perspective, the subcarrier index of d0 may be different depending on whether the offset is applied or not. To use this option, as PRB grid information of each numerology is not given before RMSI reception, transmission of SS/PBCH block and/or RMSI should not consider this offset or should assume the offset value is zero. However, this may lead confusion for RMSI transmission after the UE has received carrier information and/or explicit signaling of numerology-specific offset value. Thus, it may be assumed that numerology-specific offset is not applied for all transmission in initial DL BWP and/or SS/PBCH block/RMSI transmission in initial DL BWP and/or SS/PBCH block transmission and only RMSI transmission before RMSI reception at UE (e.g. RMSI update, initial access)

Alternatively, PRB grid for the numerology used for RMSI may be used as the reference. In case RMSI is also monitored in UE-specific BWP, the numerology used for RMSI may be the one used in initial DL BWP. Accordingly, there is no ambiguity in reading RMSI, and SS/PBCH block may be transmitted without any consideration of multiple numerologies. The offset may be determined assuming that the computed center of PRB grid for the numerology used for RMSI is the common reference frequency. In this case, the offset value can be {−12, −9, −6, −3, 0, 3, 6, 9, 12} if the largest subcarrier spacing is no larger than 4*smallest subcarrier spacing supported by the network or by the band.

Similar issue may occur for other options which will be described below as well, and similar scheme may be used to mitigate the issue.

(2) Option 2: 'd0' for signal generation of a numerology may be based on only its own numerology without considering any compensation/offset for alignments among different numerologies. For each numerology, different up-conversion frequency may be used such that the common reference frequency (different up-conversion frequency, i.e. different $f_{base}+f_{gap}^u$) is used for each numerology. For example, if the center frequency is 2 GHz, depending on the difference between the computed center frequency and the common reference frequency, 2 GHz+offset*subcarrier spacing [kHz] may be used for up-conversion for a given numerology. As discussed for Option 1, handling different approach between RMSI and other channels may be necessary for this option as well. That is, the common reference frequency may be determined based on the numerology used for RMSI. In other words, this option assumes that $f_{TX}$ (computed center frequency for each numerology) in up-conversion is same across the multiple numerologies (and determined based on the reference numerology), and in determining f0 at receiver side, f0 for each numerology is computed as $f0_{base}+\Delta^u$ (numerology-specific-offset), where $f0_{base}$ may be common for all numerologies and determined based on the reference numerology. Phase compensation between $f_{TX}-f_{RX}$ may be performed per OFDM symbol.

(3) Option 3: 'd0' for signal generation may be based on only its own numerology and up-conversion frequency for each numerology may also be fixed. The gap between each numerology's computed center frequency and common reference frequency and digital rotator may be used to compensate the value. In other words, the $\Delta^u$ (numerology-specific-offset) may be applied separately from resource mapping and up-conversion. In other words, phase compensation for each numerology may be done for $f_{TX}$ (computed center frequency for each numerology)−$f_{base}+\Delta^u$ (numerology-specific-offset) at transmitted side. Similar operation at receiver side may be performed as well.

(4) Option 4: 'd0' for signal generation may be based on only its own numerology and up-conversion frequency for each numerology may also be fixed. The center frequency for each numerology may be potentially different (i.e. like Option 2) from receiver perspective, and the transmitter may compensate the difference between the center frequency of each numerology and actual center frequency used for the numerology. At the receiver side, the computed center frequency of each numerology may be used for up-conversion/phase compensation.

Similar options may be considered for receiver and Option 3 may use digital derotation instead of rotation.

To realize different options describe above, the followings may be considered.

In baseband signal generation, different offset value may be applied for each numerology. The offset value may be determined per each numerology based on information for indicated numerologies' carrier (including its own) as mentioned in above or explicit signaling. To avoid ambiguity in RMSI reception, the numerology used in initial DL BWP may be used as the reference.

In baseband signal generation, no offset value may be applied. The up-conversion frequency f0' (i.e. $f_{base}+f_{gap}u$) may be determined per numerology. The f0' value of each numerology may be determined based on information for the indicated numerologies' carrier (including its own) as mentioned in above or explicit signaling. To avoid ambiguity in RMSI reception, the numerology used in initial DL BWP may be used as the reference.

In baseband signal generation/up-conversion, no offset value may be applied and a common reference frequency may be used for up-conversion. However, a UE may be required to shift for a given numerology by the offset which is determined based on information for the indicated numerologies' carrier (including its own) as mentioned in above or explicit signaling. How the UE/gNB implement this shift may be up to UE/gNB implementation. To avoid ambiguity in RMSI reception, the numerology used in initial DL BWP may be used as the reference.

In baseband signal generation/up-conversion, no offset value may be applied and a common reference frequency may be used for up-conversion. The transmitter may compensate any offset between the computed center frequency of each numerology and the center frequency of the used numerology such that the receiver can use the computed center frequency for each numerology as the transmitter frequency reference for phase compensation.

gNB and UE may take different options among the options described above. For example, gNB may generate baseband signal with consideration of numerology-specific offset whereas the UE may not use any numerology-specific offset in signal generation. This difference may be compensated by up-conversion or digital de-rotator as Option (2) or (3) described above. In other words, numerology-specific f0 (i.e., f0') in up-conversion may be introduced, and f0 may or may not be same among different numerologies depending on UE implementation how to compensate the difference. How the UE computes numerology-specific f0 may be up to UE implementation.

Figure 13:
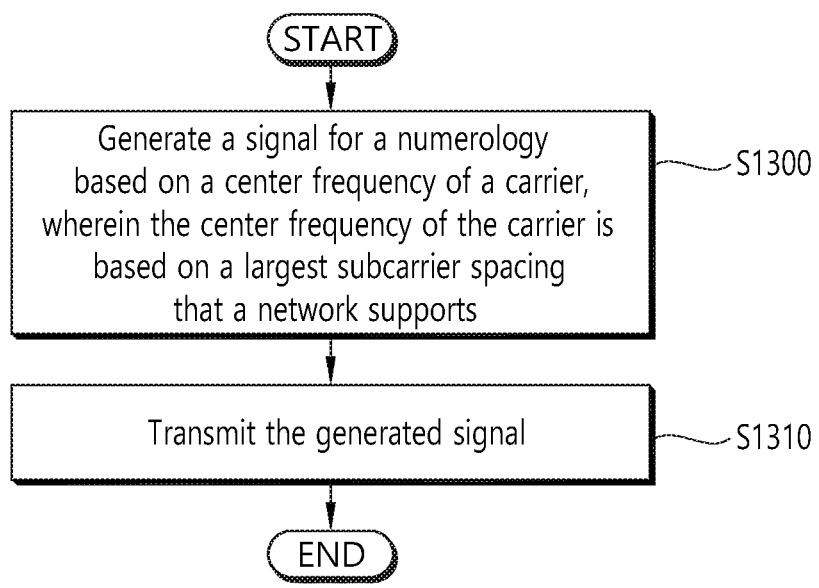
FIG. 13 shows a method for generating a signal by a UE according to an embodiment of the present invention.

FIG. 13 shows a method for generating a signal by a UE according to an embodiment of the present invention. The present invention described above, specifically approach 1, can be applied to this embodiment.

In step S1300, the UE generates a signal for a numerology based on a center frequency of a carrier. The center frequency of the carrier may be based on a largest subcarrier spacing that a network supports. The center frequency of the carrier is shifted for a center frequency of a PRB grid of the largest subcarrier spacing that the network supports. Center frequencies for different numerologies may be aligned with each other at the center frequency of the PRB grid of the largest subcarrier spacing that the network supports. The center frequency of the carrier may be determined based on an offset from point A and a number of resource blocks of the carrier. Meanwhile, the UE may receive information on an offset between the center frequency of the carrier and a center frequency of a PRB grid of the largest subcarrier spacing that the network supports.

In step S1310, the UE transmits the generated signal.

According to embodiment of the present invention shown in FIG. 13, signals for different numerologies can be generated and aligned with each other. That is, based on the center frequency of the PRB grid for the largest subcarrier spacing that the network supports, the center frequency or the reference frequency for generating the baseband signal of the PRB grid for the smaller subcarrier spacing can be shifted.

Figure 14:
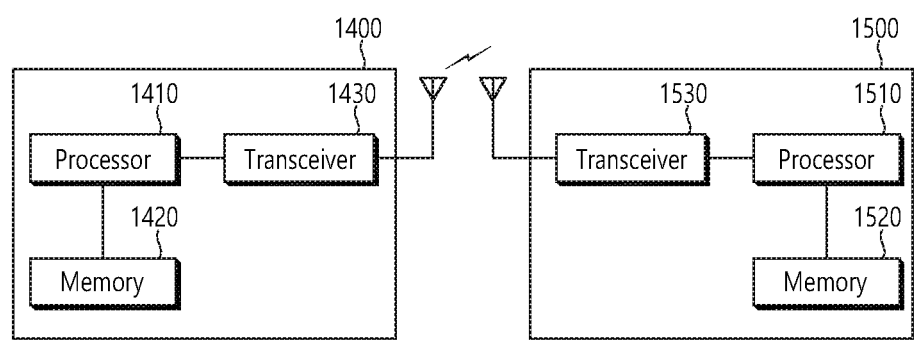
FIG. 14 shows a wireless communication system to implement an embodiment of the present invention.

FIG. 14 shows a wireless communication system to implement an embodiment of the present invention.

A UE 1400 includes a processor 1410, a memory 1420 and a transceiver 1430. The processor 1410 may be configured to implement proposed functions, procedures and/or methods described in this description. Layers of the radio interface protocol may be implemented in the processor 1410. Specifically, the processor 1410 is configured to generate a signal for a numerology based on a center frequency of a carrier. The center frequency of the carrier may be based on a largest subcarrier spacing that a network supports. The center frequency of the carrier is shifted for a center frequency of a PRB grid of the largest subcarrier spacing that the network supports. Center frequencies for different numerologies may be aligned with each other at the center frequency of the PRB grid of the largest subcarrier spacing that the network supports. The center frequency of the carrier may be determined based on an offset from point A and a number of resource blocks of the carrier. Meanwhile, the processor 1410 may be further configured to control the transceiver 1430 to receive information on an offset between the center frequency of the carrier and a center frequency of a PRB grid of the largest subcarrier spacing that the network supports.

The processor 1410 is configured to control the transceiver 1430 to transmit the generated signal.

The memory 1420 is operatively coupled with the processor 1410 and stores a variety of information to operate the processor 1410. The transceiver 1430 is operatively coupled with the processor 1410, and transmits to a network node 1500 and/or receives from the network node 1500 a radio signal.

The network node 1500 includes a processor 1510, a memory 1520 and a transceiver 1530. The processor 1510 may be configured to implement proposed functions, procedures and/or methods described in this description. Layers of the radio interface protocol may be implemented in the processor 1510. The memory 1520 is operatively coupled with the processor 1510 and stores a variety of information to operate the processor 1510. The transceiver 1530 is operatively coupled with the processor 1510, and transmits to the UE 1400 and/or receives from the UE 1400 a radio signal.

The processors 1410, 1510 may include application-specific integrated circuit (ASIC), other chipset, logic circuit and/or data processing device. The memories 1420, 1520 may include read-only memory (ROM), random access memory (RAM), flash memory, memory card, storage medium and/or other storage device. The transceivers 1430, 1530 may include baseband circuitry to process radio frequency signals. When the embodiments are implemented in software, the techniques described herein can be implemented with modules (e.g., procedures, functions, and so on) that perform the functions described herein. The modules can be stored in the memories 1420, 1520 and executed by the processors 1410, 1510. The memories 1420, 1520 can be implemented within the processors 1410, 1510 or external to the processors 1410, 1510 in which case those can be communicatively coupled to the processors 1410, 1510 via various means as is known in the art.

According to embodiment of the present invention shown in FIG. 14, signals for different numerologies can be generated and aligned with each other. That is, based on the center frequency of the PRB grid for the largest subcarrier spacing that the network supports, the center frequency or the reference frequency for generating the baseband signal of the PRB grid for the smaller subcarrier spacing can be shifted.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method performed by a user equipment (UE) wireless device in a wireless communication system, the method comprising:

receiving, from a network, information for a point A which is a reference point of each resource block grid for a plurality of subcarrier spacings, wherein the plurality of subcarrier spacings comprise a first subcarrier spacing and a second subcarrier spacing, the first subcarrier spacing is a largest subcarrier spacing supported by the network on a carrier, and the second subcarrier spacing is a subcarrier spacing different from the first subcarrier spacing;

receiving, from the network, information for a first offset which is an offset between the point A and a lowest subcarrier of the carrier for the first subcarrier spacing, and information for a number of resource blocks of the carrier for the first subcarrier spacing;

receiving, from the network, information for a second offset which is an offset between the point A and a lowest subcarrier of the carrier for the second subcarrier spacing, and information for a number of resource blocks of the carrier for the second subcarrier spacing;

calculating a first center frequency associated with the first subcarrier spacing based on the first offset and the number of resource blocks of the carrier for the first subcarrier spacing;

calculating a second center frequency associated with the second subcarrier spacing based on the second offset and the number of resource blocks of the carrier for the second subcarrier spacing;

calculating a center frequency difference which is a difference between the first center frequency and the second center frequency;

generating a signal for the second subcarrier spacing based on the center frequency difference; and transmitting the generated signal to the network.

2. A wireless device in a wireless communication system, the wireless device comprising:

a memory;

a transceiver; and at least one processor, operably coupled to the memory and the transceiver, and configured to:

control the transceiver to receive, from a network, information for a point A which is a reference point of each resource block grid for a plurality of subcarrier spacings, wherein the plurality of subcarrier spacings comprise a first subcarrier spacing and a second subcarrier spacing, the first subcarrier spacing is a largest subcarrier spacing supported by the network on a carrier, and the second subcarrier spacing is a subcarrier spacing difference from the first subcarrier spacing, control the transceiver to receive, from the network, information for a first offset which is an offset between the point A and a lowest subcarrier of the carrier for the first subcarrier spacing, and information for a number of resource blocks of the carrier for the first subcarrier spacing, control the transceiver to receive, from the network, information for a second offset which is an offset between the point A and a lowest subcarrier of the carrier for the second subcarrier spacing, and information for a number of resource blocks of the carrier for the second subcarrier spacing, calculate a first center frequency associated with the first subcarrier spacing based on the first offset and the number of resource blocks of the carrier for the first subcarrier spacing, calculate a second center frequency associated with the second subcarrier spacing based on the second offset and the number of resource blocks of the carrier for the second subcarrier spacing, calculate a center frequency difference which is a difference between the first center frequency and the second center frequency, generate a signal for the second subcarrier spacing based on the center frequency difference, and control the transceiver to transmit the generated signal to the network.

3. The method of claim 1, wherein the wireless device is in communication with at least one of a mobile device, a network, or autonomous vehicles other than the wireless device.

4. The method of claim 1, wherein a reference frequency for a baseband signal generation associated with the second subcarrier spacing is aligned to the first center frequency associated with the first subcarrier spacing.

5. The method of claim 1, wherein the center frequency difference is calculated by the wireless device by itself without receiving information for the center frequency difference from the network.

6. The wireless device of claim 2, wherein the at least one processor is further configured to align a reference frequency associated with the second subcarrier spacing is aligned to the first center frequency associated with the first subcarrier spacing, for a baseband signal generation.

7. The wireless device of claim 2, wherein the at least one processor is further configured to calculate the center frequency difference by itself without receiving information for the center frequency difference from the network.

* * * * *